United States Patent
Ying et al.

(10) Patent No.: US 7,354,562 B2
(45) Date of Patent: Apr. 8, 2008

(54) SIMULTANEOUS SHIFT-REACTIVE AND ADSORPTIVE PROCESS TO PRODUCE HYDROGEN

(75) Inventors: David Hon Sing Ying, Allentown, PA (US); Shankar Nataraj, Allentown, PA (US); Jeffrey Raymond Hufton, Fogelsville, PA (US); Jianguo Xu, Wrightstown, PA (US); Rodney John Allam, Guildford (GB); Sarah Jane Dulley, Normandy (GB)

(73) Assignee: Air Products and Chemicals, Inc., Allentown, PA (US)

( * ) Notice: Subject to any disclaimer, the term of this patent is extended or adjusted under 35 U.S.C. 154(b) by 327 days.

(21) Appl. No.: 10/280,843

(22) Filed: Oct. 25, 2002

(65) Prior Publication Data

US 2004/0081614 A1  Apr. 29, 2004

(51) Int. Cl.
*C01B 31/20*  (2006.01)
(52) U.S. Cl. ..................... 423/437.2; 95/96
(58) Field of Classification Search ............ 423/655, 423/656, 437.2, 230; 95/96
See application file for complete search history.

(56) References Cited

U.S. PATENT DOCUMENTS

| | | | |
|---|---|---|---|
| 398,968 A | * | 3/1889 | White et al. ............ 126/301 |
| 1,816,523 A | | 7/1931 | Gluud et al. |
| 2,944,627 A | * | 7/1960 | Skarstrom ................ 95/26 |
| 4,810,266 A | * | 3/1989 | Zinnen et al. ............ 95/139 |
| 4,869,894 A | * | 9/1989 | Wang et al. ............. 423/650 |
| 4,980,145 A | * | 12/1990 | Hsiung et al. ........... 423/437.2 |
| 5,152,976 A | * | 10/1992 | Fong et al. ............. 423/652 |
| 5,254,368 A | | 10/1993 | Kadlec et al. .......... 423/247 |
| 5,256,172 A | * | 10/1993 | Keefer .................. 423/230 |
| 5,300,271 A | * | 4/1994 | Golden et al. .......... 423/247 |

(Continued)

FOREIGN PATENT DOCUMENTS

DE          19946381         4/2001

(Continued)

OTHER PUBLICATIONS

Hufton, et al., Sorption Enhanced Reaction Process (SERP) For The Production of Hydrogen, Proceedings of the 1999 U.S. DOE Hydrogen Program Review, NREL/CP-570-26938.*

(Continued)

*Primary Examiner*—Stuart L. Hendrickson
*Assistant Examiner*—Daniel C. McCracken
(74) *Attorney, Agent, or Firm*—Bryan C. Hoke, Jr.

(57) ABSTRACT

A process for producing a high temperature $CO_x$-lean product gas from a high temperature $CO_x$-containing feed gas, includes: providing a sorption enhanced reactor containing a first adsorbent, a shift catalyst and a second adsorbent; feeding into the reactor a feed gas containing $H_2$, $H_2O$, CO and $CO_2$; contacting the feed gas with the first adsorbent to provide a $CO_2$ depleted feed gas; contacting the $CO_2$ depleted feed gas with the shift catalyst to form a product mixture comprising $CO_2$ and $H_2$; and contacting the product mixture with a mixture of second adsorbent and shift catalyst to produce the product gas, which contains at least 50 vol. % $H_2$, and less than 5 combined vol. % of $CO_2$ and CO. The adsorbent is a high temperature adsorbent for a Sorption Enhanced Reaction process, such as $K_2CO_3$ promoted hydrotalcites, modified double-layered hydroxides, spinels, modified spinels, and magnesium oxides.

11 Claims, 2 Drawing Sheets

U.S. PATENT DOCUMENTS

| | | | | |
|---|---|---|---|---|
| 5,518,526 | A | * | 5/1996 | Baksh et al. .................. 95/100 |
| 5,980,858 | A | * | 11/1999 | Fujimura et al. ............ 423/655 |
| 5,990,040 | A | * | 11/1999 | Hu et al. .................... 502/342 |
| 6,005,149 | A | * | 12/1999 | Bishop ........................ 585/241 |
| 6,103,143 | A | * | 8/2000 | Sircar et al. ................ 252/373 |
| 6,280,503 | B1 | | 8/2001 | Mayorga et al. ................ 95/96 |
| 6,303,092 | B1 | | 10/2001 | Anand et al. ............ 423/418.2 |
| 6,312,658 | B1 | * | 11/2001 | Hufton et al. ............ 423/418.2 |
| 6,315,973 | B1 | | 11/2001 | Nataraj et al. ............ 423/418.2 |
| 6,322,612 | B1 | * | 11/2001 | Sircar et al. .................... 95/97 |
| 2002/0098394 | A1 | | 7/2002 | Keefer et al. .................. 429/13 |
| 2002/0110503 | A1 | | 8/2002 | Gittleman et al. .......... 422/190 |

FOREIGN PATENT DOCUMENTS

| | | |
|---|---|---|
| EP | 0444987 | 2/1991 |
| EP | 0737646 | 10/1996 |
| EP | 1006079 | 6/2000 |
| EP | 1018485 | 7/2000 |
| WO | 9633794 | 10/1996 |

OTHER PUBLICATIONS

Hufton, et al., Development of a Process for CO2 Capture From Gas Turbines Using A Sorption Enhanced Water Gas Shift Reactor System [online] University of Regina [retrieved on May 4, 2007]. Retrieved from the internet: <URL: http://uregina.ca/ghgt7/PDF/p.*

Han et al., "Simultaneous Shift Reaction and Carbon Dioxide Separation for the Direct Production of Hydrogen", Chem. Eng. Sci., 49, 5875 (1994).

Han, et al., "Multicycle Performance of a Single-Step Process for H2 Production", Sep. Sci. Tech., 32, 681 (1997).

Brun-Tsekhovoi, et al., "The Process of Catalytic Steam-Reforming of Hydrocarbons in the Presence of Carbon Dioxide Acceptor", Proc. 7th World Hydrogen Energy Conf., 2, 885 (1988).

Kurdyumov, et al., "Steam Conversion of Methane in the Presence of a Carbon Dioxide Acceptor", Pet. Chem., 36, 2, 139 (1996).

Carvill, et al., "Sorption Enhanced Reaction Process", AIChE J., 42, 2765 (1996).

Hufton, et al., "Sorption Enhanced Reaction Process for Hydrogen Production", AIChE J., 45, 248 (1999).

Waldron, et al., "Production of Hydrogen by Cyclic Sorption Enhanced Reaction", AIChE J., 47, 1477 (2001).

Han et al., "Simultaneous Shift Reaction and Carbon Dioxide Separation for the Direct Production of Hydrogen", Chem. Eng. Sci., 49, 5875 (1994).

Carvill, et al., "Sorption Enhanced Reaction Process", AIChE J., 42, 2765 (1996).

Hufton, et al., "Sorption Enhanced Reaction Process for Hydrogen Production", AIChE J., 45, 248 (1999).

* cited by examiner

SIMULTANEOUS SHIFT-REACTIVE AND ADSORPTIVE PROCESS TO PRODUCE HYDROGEN

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention relates to a process and an apparatus for shifting the water gas shift reaction ($CO+H_2O \leftrightarrow CO_2+H_2$) towards the production of carbon dioxide and hydrogen by adsorbing carbon dioxide produced by the reaction.

A conventional practice for producing hydrogen product containing low levels of carbon oxides (carbon dioxide and carbon monoxide) is to purify raw syngas (from steam methane reformer, partial oxidation reactor, autothermal reformer, etc.) by cooling the gas to 600-950° F., reducing CO to ~1-5% in a high temperature shift (HTS) reactor, cooling the gas to 350-600° F., further reducing CO to ~0.2-0.4% in a low temperature shift (LTS) reactor, cooling the gas to 100° F., removing $CO_2$ in a liquid chemical or physical absorption system, and methanating carbon oxides. A more recently developed industrial practice comprises cooling the gas to 600-950° F., reducing CO to ~1-5% in a high temperature shift (HTS) reactor, cooling the gas to 100° F., and removing $CO_2$, CO, $CH_4$ and $N_2$ in a $H_2$PSA unit.

The shift reaction is carried out in shift reactors. These reactors are used to increase the amount of $H_2$ produced from the process and reduce the level of CO in the feed gas to the separation unit. The reactors are designed to permit very close approach to reaction equilibrium, so the CO conversion is limited by the shift reaction thermodynamics. Both the reaction temperature and the presence of byproduct carbon dioxide influence the reaction conversion.

Since the shift reaction ($CO+H_2O \rightarrow CO_2+H_2$) is exothermic, the CO conversion is increased with lower temperature. High temperature systems, utilizing only HTS reactors, are limited to ~75% CO conversion, and the rest of the CO (and $H_2$ that in principle could be produced via the shift reaction) is lost. The overall CO conversion can be increased to >95% by utilizing a series of HTS and LTS reactors at the expense of additional process complexity (additional cooling and LTS equipment).

Since the shift reaction conversion in conventional reactors is not 100%, a significant amount of CO will be present in the shift reactor exit gas. The effluent gas from a typical LTS reactor contains roughly 0.3% CO (3,000 ppm), 19.5% $CO_2$, 1.3% $CH_4$, and 78.9% $H_2$ (dry basis). Effluent gas from the HTS reactor will contain even more CO (1-5%) and less $CO_2$. The effluent gas must be further purified, typically in a 4- to 12-bed $H_2$PSA unit, to reduce the CO and $CO_2$ levels to <0.01%. In PEM fuel cell applications, the CO level must be reduced even further (limits typically around 10 ppm).

The presence of $CO_2$ in the HTS and LTS reactors limits the CO conversion that can be achieved. If $CO_2$ could be removed from the feed gas to the shift reactors, the CO conversion would be increased. This is not practiced, though, since the gas would require cooling for $CO_2$ removal, followed by reheating for shifting, and the added complexity is not worthwhile. Ideally, one would prefer to remove $CO_2$ from the shift reactor feed gas, and also remove $CO_2$ from the reaction gas as it progresses through the shift reactor. If $CO_2$ can be removed completely as it is formed, then the CO conversion in principle could reach 100%, and the CO would be reacted to extinction.

Accordingly, there have been a number of efforts to shift the water gas shift reaction towards production of carbon dioxide and hydrogen (i.e., towards completion) by adsorbing carbon dioxide produced by the reaction. A number of these efforts have comprised adsorbing $CO_2$ on chemical adsorbents such as calcium oxide or dolomite. Regeneration of these materials is possible only by heating the solid to 750° C. or higher, so generally these processes are classified as temperature swing adsorption systems.

For example, U.S. Pat. No. 1,816,523 to Gluud et al. proposed the use of lime or dolomite to remove $CO_2$ from the shift reaction, and regenerated the carbonate by burning fuel in the vessel to increase the temperature to 900-1000° C.

Han et al., "Simultaneous Shift Reaction and Carbon Dioxide Separation for the Direct Production of Hydrogen", Chem. Eng. Sci., 49, 5875 (1994), and "Multicycle Performance of a Single-Step Process for H2 Production", Sep. Sci. Tech., 32, 681 (1997) have also worked with the same chemisorbent, and found that the $CO_2$ capacity and carbonation rate of the dolomite decreased as it was cycled over a number of reaction/regeneration steps. In their 1994 publication, Han et al. found that the major economic obstacle for producing $H_2$ from coal using this approach was due to the substantial regeneration energy requirement.

Others have tried to use dolomite or calcium oxide chemisorbents in a reformer to enhance the steam methane reforming reaction. This approach is again based on the fact that removal of $CO_2$ from the reactor shifts the water gas shift reaction, which in turn will shift the reforming reaction to higher conversion.

For example, Brun-Tsekhovoi et al., "The Process of Catalystic Steam-Reforming of Hydrocarbons in the Presence of Carbon Dioxide Acceptor", Proc. 7th World Hydrogen Energy Conf., 2, 885 (1988) and Kurdyumov et al. "Steam Conversion of Methane in the Presence of a Carbon Dioxide Acceptor, Pet. Chem., 36, 2, 139 (1996) describe fluidized bed processes, wherein Ni reforming catalyst and dolomite are fluidized with steam and natural gas. The authors observed increased methane conversion, relatively high $H_2$ purity (94-98%), and low carbon oxide levels. They mention that the process may be capable of eliminating the need for CO-shift, $CO_2$ removal, and methanation steps, and could reduce the required operating temperature of the reformer. The articles teach the use of catalyst and dolomite of different sizes to allow separation of spent dolomite, which is subsequently regenerated at high temperature in an external furnace.

WO 96/33794 (Lyon) discloses a somewhat similar approach, using a fixed bed, CaO and Ni catalyst. The reaction of steam and hydrocarbon is carried out at 600-800° C., and the $CO_2$ formed reacts to form $CaCO_3$. Passing air through the bed regenerates it. The $O_2$ in the air exothermically reacts with Ni to form NiO, and the energy from this reaction is used to decompose $CaCO_3$ to CaO and regenerate the chemisorbent.

Researchers at Air Products and Chemicals, Inc. have obtained patents on a Sorption Enhanced Reaction process, wherein a high temperature $CO_2$ adsorbent is used to remove $CO_2$ and shift the steam methane reforming reactions to higher conversions. See, e.g., U.S. Pat. No. 6,303,092 to Anand et al. and U.S. Pat. No. 6,315,973 to Nataraj et al. and the related publications, Carvill et al., "Sorption Enhanced Reaction Process", AlChE J., 42, 2765 (1996), Hufton et al., "Sorption Enhanced Reaction Process for Hydrogen Production", AlChE J., 45, 248 (1999) and Waldron et al., "Production of Hydrogen by Cyclic Sorption Enhanced Reaction", AlChE J., 47, 1477 (2001). These researchers have described a process used to shift the reverse water gas shift reaction to enhance CO production by adsorbing water on a high temperature water adsorbent. A specific process cycle is described which utilizes pressure swing adsorption concepts for regeneration of the adsorbent. The use of $CO_2$ adsorbents for shifting the reforming reaction is also described.

Air Products and Chemicals, Inc. researchers have also patented high temperature $CO_2$ adsorbents particularly suitable for use in the aforementioned processes. See U.S. Pat. No. 6,280,503 to Mayorga et al.

EP444987 to Ogawa et al. discloses the application of high temperature $CO_2$ adsorption processes for removing $CO_2$ from turbine feed gas. Ogawa et al. used a shift reactor with heat removal to shift CO to $CO_2$, cooled the gas, and then passed it through a separate $CO_2$ PSA unit at 200-300C to remove $CO_2$. The shift reactor effluent contains all of the carbon present in the reformer feedstock. The goal was to remove carbon from the fuel gas before it was fired in the gas turbine. Specific adsorbents or adsorption process cycles are not disclosed.

Despite the foregoing developments, it is desired to provide a system of enhanced efficiency for shifting the water gas shift reaction towards the production of carbon dioxide and hydrogen by adsorbing carbon dioxide produced by the reaction.

All references cited herein are incorporated herein by reference in their entireties.

BRIEF SUMMARY OF THE INVENTION

Accordingly, the invention provides a process for producing a high temperature (i.e., a temperature of about 200-600° C. for SER) $CO_x$-lean product gas from a high temperature $CO_x$-containing feed gas (where $CO_x$ represents $CO_2$ and/or CO), said process comprising:
provide a sorption enhanced reactor containing a first adsorbent, a shift catalyst and a second adsorbent;
feeding the feed gas into the reactor during a reaction step, wherein the feed gas comprises $H_2$, $H_2O$, CO and $CO_2$;
contacting the feed gas with the first adsorbent to adsorb an amount of $CO_2$ from the feed gas and provide a $CO_2$ depleted feed gas;
contacting the $CO_2$ depleted feed gas with the shift catalyst to catalyze a shift reaction of CO and $H_2O$ to form a product mixture comprising $CO_2$ and $H_2$;
contacting the product mixture with a mixture of the second adsorbent and the shift catalyst to produce the product gas, wherein the product gas comprises at least 50 vol. % $H_2$, and less than 5 combined vol. % of $CO_2$ and CO;
regenerating the first and second adsorbents; and
repressurizing the reactor with a pressurization gas.

Also provided is an apparatus for performing the inventive process, said apparatus comprising:
a first bed comprising the first adsorbent;
a second bed comprising the mixture of the second adsorbent and the shift catalyst;
an intermediate bed between, and in fluid communication with, the first bed and the second bed, wherein the intermediate bed comprises the shift reaction catalyst;
a feed gas inlet at a feed end of the first bed;
a product gas outlet at a product end of the second bed,
wherein the first adsorbent and the second adsorbent are at least one member independently selected from the group consisting of: (a) $K_2CO_3$ promoted hydrotalcites; (b) modified double layered hydroxides represented by Formula I:

$$(Mg_{(1-x)}Al_x(OH)_2)(CO_3)_{x/2}yH_2OzM^1{}_2CO_3 \qquad (I)$$

where $0.09 \leq x \leq 0.40$, $0 \leq y < 3.5$, $0 \leq z \leq 3.5$, and $M^1$ is Na or K; (c) spinels and modified spinels represented by Formula II:

$$Mg(Al_2)O_4yK_2CO_3 \qquad (II)$$

where $0 \leq y \leq 3.5$; and (d) magnesium oxide-containing adsorbents represented by Formula III:

$$\{(M_2CO_3)_m(2MHCO_3)_{(1-m)}\}_n(MgCO_3)_p(MgO)_{(1-p)} \cdot xH_2O \qquad (III)$$
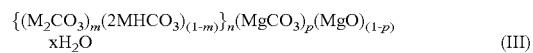

where M is an alkali metal, $0 \leq m \leq 1$, $0 \leq n \leq 1.3$, $0 \leq p < 1$, and x represents an extent of hydration of the adsorbent, with the proviso that when n equals 0 the MgO is made by dehydration and $CO_2$ removal of $\{MgCO_3\}_y\{Mg(OH)_2\}_{(1-y)} \cdot xH_2O$, in which $0.1 \leq y \leq 0.9$, and x indicates an extent of hydration.

Further provided is a single bed process for producing a high temperature $CO_x$-lean product gas from a high temperature $CO_x$-containing feed gas, said process comprising:
providing a sorption enhanced reactor containing a mixture of an adsorbent and a shift catalyst in a single bed;
feeding the feed gas into the reactor during a reaction step, wherein the feed gas comprises $H_2$, $H_2O$, CO and $CO_2$;
contacting the feed gas with the mixture of the adsorbent and the shift catalyst to produce the product gas, wherein the product gas comprises at least 50 vol. % $H_2$, and less than 5 combined vol. % of $CO_2$ and CO;
regenerating the adsorbent; and
repressurizing the reactor with a pressurization gas.

Still further provided is a single-bed apparatus for performing the single-bed process, said apparatus comprising:
a single bed comprising a mixture of the adsorbent and the shift catalyst;
a feed gas inlet at a feed end of the bed;
a product gas outlet at a product end of the bed,
wherein the adsorbent is at least one member independently selected from the group consisting of: (a) $K_2CO_3$ promoted hydrotalcites; (b) modified double layered hydroxides represented by Formula I:

$$(Mg_{(1-x)}Al_x(OH)_2)(CO_3)_{x/2}yH_2OzM^1{}_2CO_3 \qquad (I)$$

where $0.09 \leq x \leq 0.40$, $0 \leq y \leq 3.5$, $0 \leq z \leq 3.5$, and $M^1$ is Na or K; (c) spinels and modified spinels represented by Formula II:

$$Mg(Al_2)O_4yK_2CO_3 \qquad (II)$$

where $0 \leq y \leq 3.5$; and (d) magnesium oxide-containing adsorbents represented by Formula III:

$$\{(M_2CO_3)_m(2MHCO_3)_{(1-m)}\}_n(MgCO_3)_p(MgO)_{(1-p)} \cdot xH_2O \qquad (III)$$

where M is an alkali metal, $0 \leq m \leq 1$, $0 \leq n \leq 1.3$, $0 \leq p < 1$, and x represents an extent of hydration of the adsorbent, with the proviso that when n equals 0 the MgO is made by dehydration and $CO_2$ removal of $\{MgCO_3\}_y\{Mg(OH)_2\}_{(1-y)}xH_2O$, in which $0.1 \leq y \leq 0.9$, and x indicates an extent of hydration.

BRIEF DESCRIPTION OF SEVERAL VIEWS OF THE DRAWINGS

The invention will be described in conjunction with the following drawings in which like reference numerals designate like elements and wherein.

DETAILED DESCRIPTION OF THE INVENTION

The invention provides a simple, cost effective process for producing hydrogen product containing low levels of carbon oxides ($CO_x$). Preferred embodiments of the invention improve upon the prior art by providing 1) enhanced CO conversion beyond equilibrium limits, regardless of shift reactor temperature, 2) enhanced recovery of $H_2$ from the $H_2$ and CO in the reformer effluent gas stream than conventional processes, and 3) production of a relatively high purity $H_2$ product (e.g., 95+%) containing very little CO and $CO_2$. (All percentages given herein are in dry volume percent unless otherwise indicated. Likewise, all concentrations given in ppm are in dry ppm unless otherwise indicated.) In addition, certain embodiments of the inventive apparatus replace the capital and energy intensive shift reactor/separation unit process train of conventional systems with a single process unit, which combines the reaction and separation functions. The invention is particularly useful for producing relatively pure $H_2$ for refinery operations, low CO hydrogen fuel for PEM fuel cells, and/or decarbonized hydrogen gas for low $CO_2$ emission power generation.

The process is conducted in conjunction with a Sorption Enhanced Reaction unit (sometimes referred to hereinafter as a sorption enhanced reactor or simply "reactor"), where the water gas shift reaction is carried out in the presence of a suitable $CO_2$ adsorbent. It is preferred to conduct the inventive process in a series of cycles in more than one reactor, wherein one reactor is being regenerated while another reactor is being operated in parallel to produce the product gas.

Figure 1:
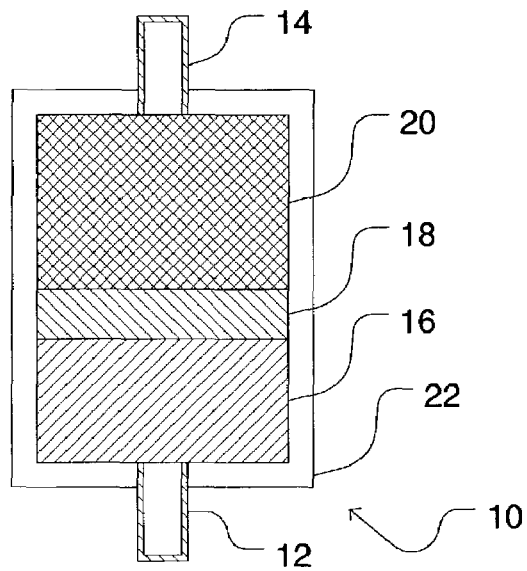
FIG. 1 is a schematic cross-section of a Sorption Enhanced Reaction vessel of the invention.

Referring to FIG. 1, reactor 10 is a vessel having feed gas inlet 12 at the feed end of the vessel, product gas outlet 14 at the product end of the bed, first bed 16 downstream of feed gas inlet 12, intermediate bed 18 downstream of first bed 16, second bed 20 downstream of intermediate bed 18, and insulated walls 22 surrounding the beds. While the contents of reactor 10 are described as three beds, the contents can also be described as a single, three-layered, bed.

In preferred embodiments, the first and second beds independently comprise at least one special high temperature $CO_2$ adsorbent, which does not require high temperature regeneration (e.g., regeneration at temperatures of at least 700° C). Thus, adsorbents such as CaO and dolomite are preferably excluded from the inventive process. Instead, preferred adsorbents of the invention have high $CO_2$ adsorption capacity at process temperatures greater than 200° C., even in the presence of steam. Suitable adsorbents include but are not limited to: (a) solid adsorbents containing metal oxides wherein the metal is at least one of sodium, magnesium, manganese and lanthanum; (b) $K_2CO_3$ promoted hydrotalcites; (c) solid adsorbents containing modified double layered hydroxides represented by Formula I:

(Mg$_{(1-x)}$Al$_x$(OH)$_2$)(CO$_3$)$_{x/2}$yH$_2$OzM$^1_2$CO$_3$     (I)

where $0.09 \leq x \leq 0.40$, $0 \leq y \leq 3.5$, $0 \leq z \leq 3.5$, and $M^1$ is Na or K; (c) spinels and modified spinels represented by Formula II:

Mg(Al$_2$)O$_4$yK$_2$CO$_3$     (II)

where $0 \leq y \leq 3.5$; and (e) magnesium oxide-containing adsorbents represented by Formula III:

$\{(M_2CO_3)_m(2MHCO_3)_{(1-m)}\}_n(MgCO_3)_p(MgO)_{(1-p)}$
xH$_2$O     (III)

where M is an alkali metal, $0 \leq m \leq 1$, $0 \leq n \leq 1.3$, $0 \leq p < 1$, and x represents an extent of hydration of the adsorbent, with the proviso that when n equals 0 the MgO is made by dehydration and $CO_2$ removal of $\{MgCO_3\}_y\{Mg(OH)_2\}_{(1-y)}xH_2O$, in which $0.1 \leq y \leq 0.9$, and x indicates an extent of hydration.

Intermediate bed 18 comprises a shift catalyst for catalyzing the water shift reaction. Suitable shift catalysts include but are not limited to: (a) high temperature shift catalyst (HTS), composed of $Fe_2O_3/Cr_2O_3$ (e.g., catalyst 71-5, available from Synetix, Billingham, UK) and active in the temperature range 350-550° C.; (b) low temperature shift (LTS) catalysts and medium temperature shift (MTS) catalysts, based on CuO/ZnO (e.g., catalysts 83-3, 83-6, available from Synetix, Billingham, UK), and active in the temperature range 175-350° C.; and (c) shift catalysts based on noble metals as described in the literature.

In the preferred embodiment of FIG. 1, second bed 20 contains the shift catalyst in addition to adsorbent (which can be identical to or different from the adsorbent in the first bed). The shift catalyst and adsorbent can be provided in the second bed in equal or unequal amounts. The mixture in the second bed can consist of a physical admixture of adsorbent and catalyst particles. It can also consist of particles that individually comprise both the adsorbent and the shift catalyst. For example, the adsorbent may be processed to include active metals with sufficient catalytic activity for the water gas shift reaction. For a physical admixture, the relative concentrations of the shift catalyst and adsorbent can be a function of location in the second bed, such that a shift catalyst (or adsorbent) concentration gradient is provided. The volume ratio of adsorbent to catalyst in the second bed is preferably 0.25 to 10, more preferably 3 to 10. When a gradient is provided in the second bed, the percentage (volume) of adsorbent preferably increases from feed end to product end of the second bed, preferably from 0 to 100%, more preferably from 30 to 100%.

It is also possible to utilize a single bed reactor packed with a mixture of adsorbent and shift catalyst (as a mixture of separate adsorbent and catalyst particles or as a collection of particles each comprising the adsorbent and the shift catalyst). This approach simplifies reactor packing, but will yield lower volumetric productivity (moles of $H_2$ produced per volume of reactor).

Reactor 10 is preferably an adiabatic vessel, as indicated by insulated walls 22 in FIG. 1. Suitable insulation includes but is not limited to glass fiber, calcium silicate, and mineral wool. The temperature achieved in the reactor depends on the syngas feed temperature and composition. For an example case of syngas generated by steam methane reforming, complete reaction of CO contained in the syngas in a steady state, adiabatic catalyst-only shift reactor would yield an increase in product temperature of 65.6° C. compared to the syngas feed temperature. In the case of an SER reactor, the temperature will swing from a maximum at the end of the reaction step to a minimum at the end of the regeneration step. The maximum temperature increase would likely be larger than 65.6° C., since the heat of adsorption of $CO_2$ would contribute to the heat generation term. If the maximum temperature is higher than the acceptable operating temperature for the shift catalyst or $CO_2$ adsorbent, then provisions (e.g., active thermal control means in addition to or in lieu of passive insulation) must be included for removing heat from the reactor. Such provisions can include a shell and tube reactor, where the catalyst and adsorbent are placed in the tubes, and a heat transfer medium is passed through the shell. For adsorption temperatures of up to 320° C., the shell side fluid is preferably water, and steam is generated. The reactor can then replace all shift reactors and the HTS boiler of a conventional $H_2$ plant. The shells would be in fluid communication with the plant steam drum via down corners and risers.

For adsorption temperatures above 316° C., a separate heat transfer fluid (such as Dowtherm A) can be used. See, e.g., U.S. Pat. No. 6,315,973 at FIG. 7 and the corresponding text therein. These fluids are generally limited to about 425° C., and at higher temperatures, heat transfer to hot air or process gas would be appropriate.

Although the process is preferably conducted in sorption enhanced reactor vessel(s), it is also within the scope of the invention to conduct the process in other containers or on other substrates. For example, it is possible to separate the three beds depicted in FIG. 1 into three interconnected vessels, rather than the single vessel shown in the figure. This would facilitate removal of catalyst from the intermediate bed, without disturbing the first and second beds.

The apparatus of FIG. 1 can be employed to produce $H_2$ substantially free of carbon-oxides without a $H_2$PSA. This is accomplished by treating effluent gas (generically referred to as "syngas") from a syngas generator, such as a steam methane reformer (SMR), a partial oxidation reactor (POX), or an autothermal reformer (e.g., an air-blown or oxygen-blown ATR). This gas will generally comprise a mixture of $H_2$, $H_2O$, CO, $CO_2$, $CH_4$, and $N_2$. Preferably, the gas fed to the SER reactor comprises 25-75 vol. % $H_2$, 10-50 vol. % $H_2O$, 1-20 vol. % CO, 1-20 vol. % $CO_2$, 0-50% N2, and 0.1-5 vol. % $CH_4$. High levels of $N_2$ would be present if the syngas was generated via an air-blown ATR. The syngas from the syngas generator can be sent to the SER unit, or it may be first processed in a conventional HTS reactor to reduce the CO level in the SER feed gas. The final feed to the SER unit may need to be heat exchanged and/or have its moisture content adjusted prior to treatment in reactor 10. The syngas feed typically contains steam in excess of what is stoichiometrically required to convert all the CO in the syngas. If not, steam can be added before the syngas enters reactor 10.

Any unconverted methane, nitrogen, argon or other inerts are not converted or significantly reduced in the SER reactor. For non-air based syngas generators, the inert component at highest concentration is methane. Since methane leakage from a POX front-end is only about 0.4 mole % dry, the purity of the $H_2$ effluent from the shift-SER reactor in this case will be in excess of 98%. Likewise, as illustrated in the Examples below, methane leakage from SMR's can be reduced to <2.5% dry with 900° C. outlet temperatures (S/C 3.5, 2.07 MPa). These conditions are typical of SMR's for syngas production. In both cases, CO and $CO_2$ levels will be very low (e.g., 0-1 vol. %) in the product gas from the SER unit.

The syngas feed in the reactor of FIG. 1 passes from the bottom of the bed to the top, but other orientations, such as top to bottom, are also possible. Reactor 10 is illustrated as an adiabatic (insulated) vessel packed with three layers of solid material. The desired reactor temperature will lie within the range of 175 to 550° C., depending on the type of catalyst and adsorbent used. Generally, the feed syngas is available at 175 to 550° C. and relatively high pressure dictated by the operation of the syngas generator (e.g., up to 3.5 MPa). During the SER reaction step, this gas is preferably fed into the SER reactor at a flow rate of 5 to 50 gmole/hr/cm². The average reactor temperature during the process will be similar to the feed syngas temperature. Localized reaction temperatures will vary by 20-70° C. during the process cycle since the reaction step is exothermic (both the shift reaction and the $CO_2$ adsorption), and regeneration is endothermic ($CO_2$ desorption).

During the reaction step, the syngas first passes through first bed 16, which contains a layer of previously regenerated high temperature $CO_2$ adsorbent where $CO_2$ present in the syngas is removed. The length of this adsorbent-only layer is sufficient to remove all of the $CO_2$ entering reactor 10 during the reaction step. The process gas leaving first bed 16 contains a reduced amount of (and preferably an absence of) $CO_2$.

The $CO_2$ depleted gas from first bed 16 passes to intermediate bed 18, which contains only shift catalyst. Some of the CO reacts with $H_2O$ to form $CO_2$ and $H_2$ in intermediate bed 18. The length of this catalyst-only zone is sufficient to equilibrate the process gas.

The resulting process gas from intermediate bed 18 is next passed to second bed 20, which contains an intimate mixture of shift catalyst and high temperature $CO_2$ adsorbent. This mixture could be uniform throughout the length of the bed, or could be catalyst-rich or adsorbent-rich towards the product end of the reactor. As the process gas from intermediate bed 18 (sometimes referred to herein as "the product mixture") flows through the catalyst/adsorbent admixture, the gas progressively contacts fresh catalyst/adsorbent, $CO_2$ is progressively adsorbed to near extinction, and additional CO is forced to react with steam (CO+$H_2O$↔$CO_2$+$H_2$). This forms additional $CO_2$, which is also progressively removed, thereby reducing the CO level to near extinction. A concentration wave-front is established, which progresses along second bed 20 at a rate determined by the capacity of the bed to hold $CO_2$. Downstream of this wave-front, gas essentially free of carbon-oxides flows to product gas outlet 14 where it is withdrawn as product. The steam in this product can be easily removed by condensation and thermal swing adsorption, if drier product is required. The length of second bed 20 is sufficient to contain the concentration wave and prevent significant breakthrough of $CO_2$ or CO.

Once the concentration wave approaches the end of second bed 20, the reaction step is terminated by stopping feed gas flow to reactor 10, and the reactor beds are regenerated.

Prior to regenerating the reactor beds, reactor 10 can optionally be countercurrently purged at feed gas pressure with purge gas. The effluent gas from this step will contain unreacted CO and $H_2O$ which can be recycled and combined with feed gas to another SER reactor. In this way, one can produce a $CO_2$ and CO depleted product stream with enhanced hydrogen recovery. Alternatively, reactor 10 can optionally be cocurrently rinsed at feed gas pressure with $CO_2$ product before regenerating, to recover a $CO_2$ and CO depleted product stream with enhanced hydrogen recovery and a $CO_2$-rich byproduct stream (during the regeneration step). As used herein the term "cocurrent" refers to passing a substance through the reactor in the same direction as the feed gas, and the term "countercurrent" refers to passing a substance in the opposite direction of the feed gas (with respect to the direction of the feed gas during the reaction step).

To regenerate the reactor beds, reactor 10 is first depressurized countercurrent to the feed gas, and then purge gas (e.g., steam, a steam/$H_2$ mixture, or any other suitable gas free of $CO_2$) is passed through the bed countercurrent to the feed. This purge helps to strip $CO_2$ off the adsorbent. The desorption of $CO_2$ from a loaded bed is endothermic. Ideally, the energy needed to desorb $CO_2$ can be obtained from the thermal energy content of the reactor packing, which is high at the beginning of the desorption step. Superheating the purge gas can provide additional heat. Alternatively, for the shell and tube configuration discussed above, with steam heat transfer medium, heat can provided by mixing steam into the saturated water flowing through the downcomer from the steam drum into the reactor shells. This keeps the shell under a constant flow and pressure. The shell has temporarily switched from being a boiler to being a barometric condenser.

The purge effluent is cooled to knock out the steam, and the condensate is reused. The non-condensate is a crude $CO_2$ stream that, optionally, can be fed to a liquefaction plant for production of byproduct $CO_2$.

Once the purge step is completed, the reactor is pressurized to the syngas feed pressure with steam, a steam/$H_2$ mixture, syngas feed, or any combination of the three. Thus, in embodiments, the pressurization gas comprises at least one of the purge gas and the feed gas. Steam and steam/$H_2$ would be fed countercurrently, while syngas feed would be fed cocurrently. Once pressurized, the reactor is ready to repeat the process cycle and receive syngas feed.

The above process steps are preferably conducted with two or more reactors operated in parallel so that a constant feed and product stream can be obtained.

Figure 2:
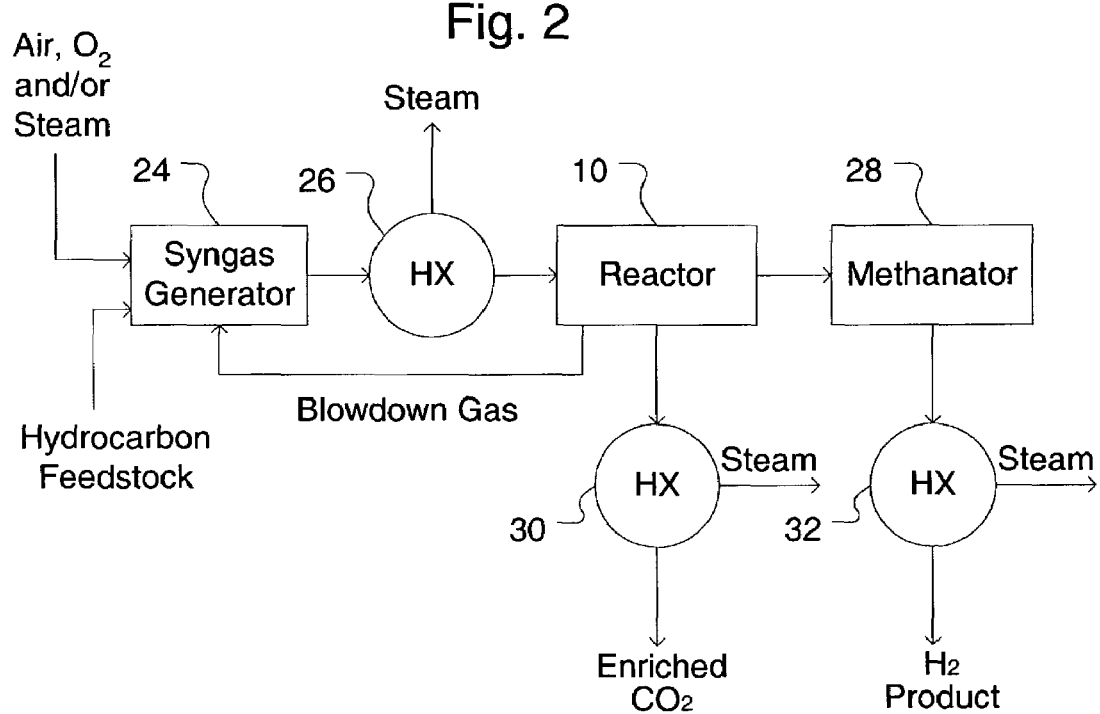
FIG. 2 is a flow diagram of an embodiment of the process of the invention for producing $H_2$.

In certain embodiments, any remaining carbon oxides in the product gas can be converted to methane in a methanator to yield a product gas containing less than 50 ppm CO, and more preferably less than 1 ppm CO. A schematic of this approach is illustrated in FIG. 2. A hydrocarbon feedstock (e.g., natural gas, naphtha) and air, oxygen and/or steam are fed to syngas generator 24 to produce syngas, which is then fed to heat exchanger (e.g., waste heat boiler) 26, where steam is generated and the temperature of the syngas is reduced. The syngas is then fed to SER reactor 10 to produce the product gas, which is fed to methanator 28. The exit temperature of the product gas from reactor 10 is in the appropriate range for methanator operation (e.g., 300 to 550° C.). Water knock-out is not required. At these conditions, equilibrium methanation calculations for a steam methane reforming example case indicate that the shift-SER product gas containing 471 ppm CO and 0.33% $CO_2$ (dry basis) yields a CO content of only 0.6 ppb in the methanator effluent. Normal methanator operation occurs commercially in the absence of water. But preformer catalyst can substitute in this service, and has been demonstrated in the presence of steam. This approach can yield $H_2$ product that can be used in refinery applications and in PEM fuel cells. The major attractiveness of this approach is that expensive $H_2$ purification or CO removal technology ($H_2$-PSA or preferential oxidation reactor) is not required.

The $CO_2$ enriched purge gas from reactor 10 is preferably heat exchanged by heat exchanger 30 to generate steam. Likewise, the $H_2$ enriched product gas from methanator 28 is preferably heat exchanged by heat exchanger 32 to generate steam. Blowdown gas from reactor 10 is recycled back to syngas generator 24 to be compressed and added as feed or, for SMR applications, used as fuel in the reformer burners. The shift-SER process combined with a methanator preferably produces product containing 95-99% $H_2$, 1-4% $CH_4$, and less than 1 ppm of CO with no pressure swing adsorption separation unit. This gas is attractive as feed for PEM fuel cell system since the CO level is low and the gas is hydrated.

Figure 3:
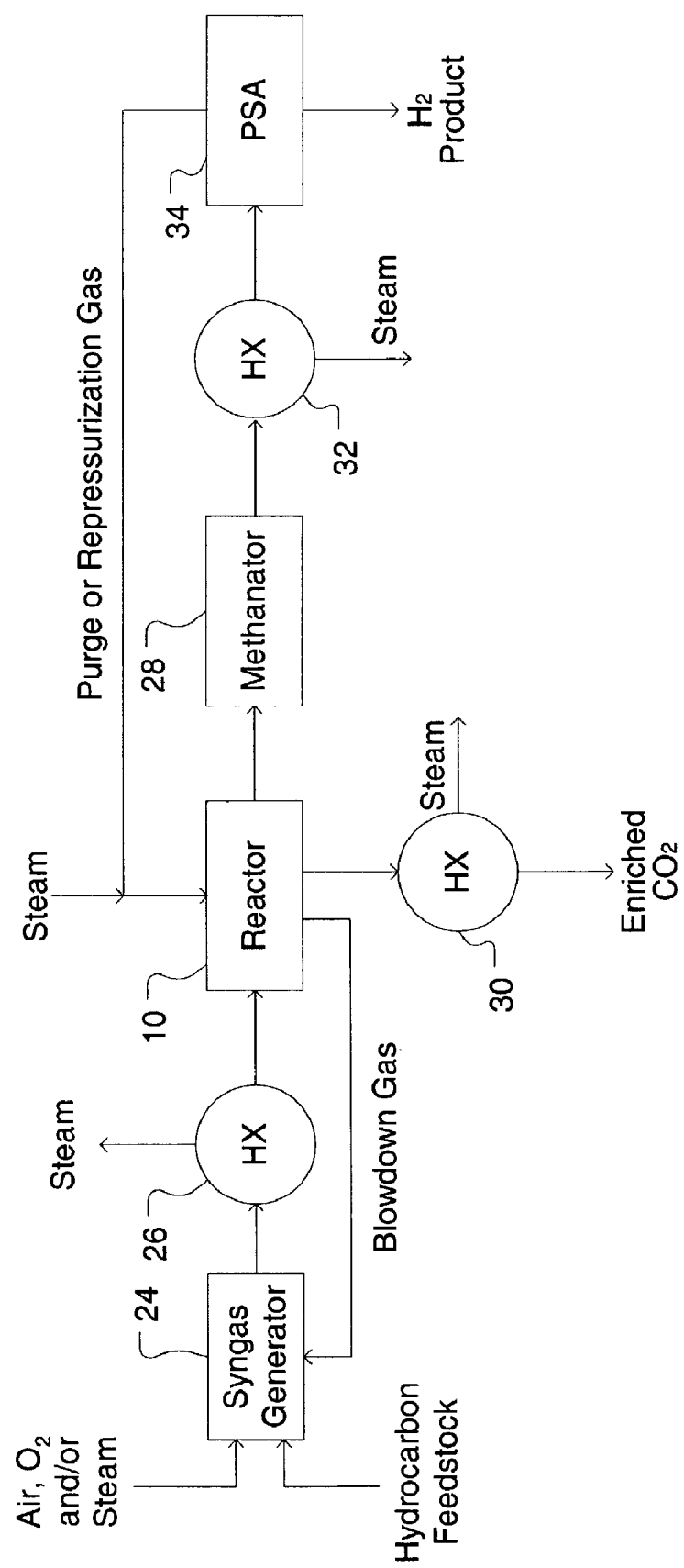
FIG. 3 is a flow diagram of another embodiment of the process of the invention for producing $H_2$.

For $H_2$ purities greater than 99%, a PSA is preferred to remove unreacted $CH_4$ from the syngas generator, as shown in the embodiment of FIG. 3, wherein product gas from reactor 10 is treated by methanator 28 to remove carbon oxides from the product gas and heat exchanged by heat exchanger 32 before entering PSA 34. A PSA used in the invention can be predominantly carbon-based if desired, and therefore relatively inexpensive. In a conventional $H_2$-PSA, the carbon removes water, $CO_2$, and most of the $CH_4$, and constitutes 40-60% of the bed. The remainder of the bed is molecular sieve, which removes CO, $N_2$, Ar and remaining methane. In the current embodiment, and depending on the $N_2$ content of the natural gas, greater than 99% purity can be achieved in a PSA filled predominantly with carbon; the molecular sieve layer is substantially reduced since only ppm levels of CO have to be removed. This would result in substantial savings in capital, and could increase the $H_2$PSA recovery.

If a PSA is used, the PSA adsorber beds and SER reactors can be synergistically coupled to minimize unrecovered product. The PSA waste gas obtained as effluent during the purge step does not contain any component that would hurt the SER reactor (i.e., no carbon oxides). Thus, PSA waste gas can augment the SER reactor purge flow. More interestingly, the PSA beds can pressure equalize with an SER reactor at lower pressure. These steps ensure that product lost from either process is not additive in nature. The minimum number of PSA or SER reactors required is also reduced. Normally, for an isolated pressure swing process, the minimum number of vessels must exceed the number of pressure equalizations by two. Coupling of the SER reactors with the $H_2$-PSA vessels can ease this requirement.

Unlike a conventional $H_2$PSA, pure $H_2$ is preferably not used to purge or repressurize the SER reactor—steam is the main candidate. Purge efficacy is determined on an actual cubic feet (ACF) basis. For the same ACF at the same purge pressure, steam has only $\frac{1}{18}$ the heating value of methane. Since steam and methane are substantially valued proportional to their heating value, and hydrogen is valued at a much higher premium relative to its heating value than steam, steam is the cheapest purge gas available (other than air, which cannot be used due to $O_2$ content). The use of steam also simplifies $CO_2$ recovery from the shift-SER reactor purge effluent gas since it can be simply condensed and separated as liquid water.

Most shift catalysts used in the SER reactor function only in a reduced state. Steam can potentially oxidize the active metal phase of the catalyst. Thus (depending on the catalyst oxidation kinetics and purge cycle time) it may be desirable to have some $H_2$ present in the purge steam. Thermodynamic calculations indicate that very small amounts of $H_2$ (e.g., 0.001% or less) are capable of maintaining reducing conditions for both the Fe- and Cu-based catalysts. For embodiments of the invention with no $H_2$-PSA, this $H_2$ would come from the product stream. For embodiments that include a $H_2$—PSA for final cleanup, the $H_2$PSA purge effluent (waste gas) can be used as the hydrogen source.

Inert gases can also be considered for purging the shift-SER reactor. Nitrogen might be attractive if the syngas generator is oxygen-based, since a significant amount of coproduct $N_2$ may be available from the air separation plant. Natural gas can be used as purge, and the effluent waste gas can be used for fuel. Other inert gases can be considered, but would have to be passed in a recycle loop where $CO_2$ is removed and discharged to minimize inert gas requirement. This would not be as attractive as the above options. Finally, a portion of the shift-SER product could be used as purge fluid, but this would substantially decrease the recovery of $H_2$ from the shift-SER reactor.

In the case of fuel cell applications, the spent fuel gas exiting the fuel cell can be used to purge the SER reactor since this gas is free of carbon oxides.

The process cycle can be tailored for achieving higher $H_2$ recovery, and for production of byproduct $CO_2$ at high purity and recovery.

Higher feed gas recovery can be achieved by countercurrently rinsing the SER reactor with purge fluid at reaction step pressure. This step would be carried out after the reaction step has completed, but before the SER reactor is regenerated. The high pressure purge step would proceed until the purge gas begins to break through the feed end of the reactor. This will allow recovery of some of the void gas, which will contain $H_2$, $H_2O$, CO, $CH_4$, and $CO_2$. If the purge gas is available at a substantially higher pressure than the reaction step pressure, then the recovered gas can be removed at the higher pressure, stored in a separate tank, and slowly added to the feed gas for another SER reactor. If the purge gas pressure is not sufficient, the recovered gas will need slight compression before it is added to the feed gas. The standard blowdown and purge steps would take place once the above recovery step has completed.

The effective recovery of hydrogen with the SER system can exceed the effective recovery in conventional shift/$H_2$-PSA systems, and in fact can approach 100% if high-pressure purge steps are included in the cycle.

Relatively pure $CO_2$ (e.g., 98+%) can be produced by including a $CO_2$ rinse step between the reaction and regeneration steps. By passing $CO_2$ product (e.g., 98+% $CO_2$) cocurrently or countercurrently through the bed at reaction pressure, essentially all of the void gas can be removed. Depressurization and purge with steam will recover the high purity $CO_2$ present in the void gas and $CO_2$ desorbed from the adsorbent. Since $CO_2$ adsorption on the high temperature adsorbents is highly selective to $CO_2$, a high purity $CO_2$ product will be recovered. Separation of the steam from $CO_2$ can be accomplished by cooling and, if required, thermal swing adsorption. The $CO_2$ will be recovered at the regeneration pressure when the regeneration step is carried out above 14.7 psia (101 kPa). For subatmospheric regeneration, the $CO_2$ will be recovered at the discharge pressure of the vacuum system (typically around 101 kPa).

This process option is highly attractive for decarbonization of fuel gas to power generation systems (e.g., gas turbine). The only carbon in the $H_2$ product is in the form of $CH_4$, which slips through the syngas generator. This is a relatively small amount of carbon. Table 1, below, shows that up to 94% of the carbon in the methane feed to the steam reformer can be removed as $CO_2$ in the shift-SER unit. Advantages of the approach are that carbon removal is carried out at high temperature (so steam is retained in the feed to the turbine, and cooling/liquid separation/heating equipment is not needed) and high pressure (separation at turbine feed conditions rather than turbine exhaust conditions). Retention of the steam and high temperature in the hydrogen fuel gas yields higher overall energy efficiency.

Other process steps that are found in the conventional pressure swing adsorption literature could also be carried out (e.g., pressure equalization steps between SER reactors, low pressure product rinse step when non-steam purge gases are used, etc.).

The invention will be illustrated in more detail with reference to the following Examples, but it should be understood that the present invention is not deemed to be limited thereto.

EXAMPLES

What follows are prospective examples of the process of the invention based on mass balance calculations.

Heat effects were not considered in the examples—the reactor was assumed to operate isothermally to simplify the calculations. A reactor temperature of 375° C. and pressure of 2.07 MPa were assumed.

An apparatus including two SER reactors of FIG. 1 is provided. The composition of the syngas feed, considering equilibrium conversion of steam and methane in a reformer at a 3.5 molar steam/methane ratio, 900° C. exit temperature, and 2.07 MPa, is 49.53% $H_2$, 34.80% $H_2O$, 9.36% CO, 5.36% $CO_2$, and 1.44% $CH_4$. Nitrogen, a common low level impurity in natural gas, was ignored in the example case. In practice the $N_2$ will follow the $CH_4$ in the SER process. The syngas is cooled to 375° C. and fed to the SER unit. Each SER reactor 10 is operated at 375° C. and is subjected to a series of cyclic process steps consisting of reaction and regeneration steps. During the reaction step, bulk $CO_2$ in the feed gas is removed by adsorption, the shift reaction is catalyzed to form $CO_2$ and $H_2$ from CO and steam, and the $CO_2$ is continually removed from the reaction product gas by adsorption onto the high temperature adsorbent.

The process gas leaving first bed 16 will contain 52.34% $H_2$, 36.78% $H_2O$, 9.89% CO, and 0.99% $CH_4$, assuming only $CO_2$ is removed by the adsorbent. Assuming that no components are removed by the catalyst, the product mixture from intermediate bed 18, calculated assuming reaction equilibrium at 375° C., will contain 61.05% $H_2$, 28.06% $H_2O$, 1.18% CO, 8.71% $CO_2$, and 0.99% $CH_4$.

The removal of $CO_2$ in second bed 20 will drive the shift reaction to high conversion, regardless of operating temperature, and will yield product containing very low levels of carbon oxides. Assuming complete removal of $CO_2$ by second bed 20, the product gas from reactor 10 will contain 69.06% $H_2$, 29.83% $H_2O$, and 1.10% $CH_4$, or 98.4% $H_2$ and 1.57% $CH_4$ on a dry basis. In practice, the reaction step would generally proceed until the $CO_2$ level reached a prescribed, but low, level. Assuming the gas to be at reaction equilibrium, one can calculate the level of CO that coexists with the $CO_2$ as $CO_2$ is removed from the system. These gas compositions for the example conditions are listed in Table 1. The major point is that the CO level will be reduced to levels lower than $CO_2$ at equilibrium. For example, at 93.02% removal of the carbon introduced with the reformer feed gas, the dry gas composition is 471 ppm CO when the equilibrium $CO_2$ mole fraction (dry) is 0.33%.

Following the reaction step, the feed gas flow is switched to another reactor 10 so that a constant feed and product stream can be obtained. The first reactor is regenerated by depressurization and countercurrent purging, preferably with steam, which helps to strip $CO_2$ off the adsorbent. The purge effluent is cooled to remove water, and the non-condensate is a crude $CO_2$ byproduct stream.

In order to compare the shift-SER reactor performance with conventional shift reactor/$H_2$—PSA approach, we have evaluated an effective recovery, $R_{eff}$, defined as the lb-moles (or kg-moles) of $H_2$ obtained in the product divided by the lb-moles (or kg-moles) of CO and $H_2$ in the syngas feed gas. For a conventional HTS/$H_2$—PSA system (assuming equilibrium conversion in the shift reactor at 375° C. and a PSA $H_2$ recovery of 85%), the $R_{eff}$ value is 0.825. For a conventional HTS/LTS/$H_2$-PSA system (assuming equilibrium conversion in the LTS reactor at 250° C. and a PSA $H_2$ recovery of 85%), the $R_{eff}$ value is 0.845. The value of $R_{eff}$ for the example shift-SER process conducted at 375° C. is 0.930 (and in other embodiments is at least 0.9), or 10-13% greater than the conventional approaches. (It was assumed that gas losses from the sorber/reactor were due to complete void gas removal during regeneration. Purge gas was assumed to be steam or $N_2$; no product gas was used. Gas requirements for generating the purge gas (e.g., methane to generate steam) were not considered.) The elimination of the need for product purge and effective conversion of the CO in the shift-SER reactor yields improved recovery of valuable hydrogen product.

While the invention has been described in detail and with reference to specific examples thereof, it will be apparent to one skilled in the art that various changes and modifications can be made therein without departing from the spirit and scope thereof.

TABLE 1

| % carbon (CO$_2$) removed from reformer CH$_4$ feed | Dry Gas Compositions | | | | | |
|---|---|---|---|---|---|---|
| | yCO dry | | yCO$_2$ dry | | yH$_2$ | yCH$_4$ |
| | % | Ppm | % | ppm | dry % | dry % |
| 0.00 | 14.36 | 143644.48 | 8.22 | 82205.46 | 75.98 | 1.44 |
| 83.11 | 2.34 | 23426.46 | 17.87 | 178682.51 | 78.50 | 1.29 |
| 83.56 | 0.35 | 3468.07 | 2.44 | 24360.13 | 95.69 | 1.53 |
| 84.02 | 0.33 | 3329.48 | 2.34 | 23375.29 | 95.80 | 1.53 |
| 84.47 | 0.32 | 3190.50 | 2.24 | 22388.58 | 95.91 | 1.53 |
| 84.92 | 0.31 | 3051.11 | 2.14 | 21399.99 | 96.02 | 1.53 |
| 85.37 | 0.29 | 2911.32 | 2.04 | 20409.52 | 96.13 | 1.54 |
| 85.82 | 0.28 | 2771.12 | 1.94 | 19417.16 | 96.24 | 1.54 |
| 86.27 | 0.26 | 2630.51 | 1.84 | 18422.91 | 96.36 | 1.54 |
| 86.72 | 0.25 | 2489.50 | 1.74 | 17426.76 | 96.47 | 1.54 |
| 87.17 | 0.23 | 2348.08 | 1.64 | 16428.71 | 96.58 | 1.54 |
| 87.62 | 0.22 | 2206.24 | 1.54 | 15428.75 | 96.69 | 1.54 |
| 88.07 | 0.21 | 2063.99 | 1.44 | 14426.88 | 96.81 | 1.54 |
| 88.52 | 0.19 | 1921.33 | 1.34 | 13423.09 | 96.92 | 1.55 |
| 88.97 | 0.18 | 1778.26 | 1.24 | 12417.37 | 97.03 | 1.55 |
| 89.42 | 0.16 | 1634.76 | 1.14 | 11409.73 | 97.15 | 1.55 |
| 89.87 | 0.15 | 1490.85 | 1.04 | 10400.15 | 97.26 | 1.55 |
| 90.32 | 0.13 | 1346.51 | 0.94 | 9388.63 | 97.37 | 1.55 |
| 90.77 | 0.12 | 1201.76 | 0.84 | 8375.17 | 97.49 | 1.55 |
| 91.22 | 0.11 | 1056.58 | 0.74 | 7359.76 | 97.60 | 1.56 |
| 91.67 | 0.09 | 910.98 | 0.63 | 6342.39 | 97.72 | 1.56 |
| 92.12 | 0.08 | 764.95 | 0.53 | 5323.06 | 97.83 | 1.56 |
| 92.57 | 0.06 | 618.49 | 0.43 | 4301.76 | 97.95 | 1.56 |
| 93.02 | 0.05 | 471.60 | 0.33 | 3278.50 | 98.06 | 1.56 |
| 93.47 | 0.03 | 324.29 | 0.23 | 2253.25 | 98.18 | 1.56 |
| 93.52 | 0.02 | 176.54 | 0.12 | 1226.03 | 98.29 | 1.57 |
| 93.56 | 0.02 | 161.74 | 0.11 | 1123.20 | 98.31 | 1.57 |
| 93.61 | 0.01 | 146.94 | 0.10 | 1020.34 | 98.32 | 1.57 |
| 93.65 | 0.01 | 132.13 | 0.09 | 917.47 | 98.33 | 1.57 |
| 93.70 | 0.01 | 117.33 | 0.08 | 814.58 | 98.34 | 1.57 |
| 93.75 | 0.01 | 102.50 | 0.07 | 711.67 | 98.35 | 1.57 |
| 93.79 | 0.01 | 87.68 | 0.06 | 608.74 | 98.36 | 1.57 |
| 93.84 | 0.01 | 72.85 | 0.05 | 505.79 | 98.38 | 1.57 |
| 93.88 | 0.01 | 58.03 | 0.04 | 402.81 | 98.39 | 1.57 |
| 93.93 | 0.00 | 43.19 | 0.03 | 299.82 | 98.40 | 1.57 |

TABLE 1-continued

| % carbon (CO$_2$) removed from reformer CH$_4$ feed | Dry Gas Compositions | | | | | |
|---|---|---|---|---|---|---|
| | yCO dry | | yCO$_2$ dry | | yH$_2$ | yCH$_4$ |
| | % | Ppm | % | ppm | dry % | dry % |
| 93.93 | 0.00 | 28.35 | 0.02 | 196.81 | 98.41 | 1.57 |
| 93.93 | 0.00 | 26.87 | 0.02 | 186.51 | 98.41 | 1.57 |
| 93.94 | 0.00 | 25.39 | 0.02 | 176.21 | 98.41 | 1.57 |
| 93.94 | 0.00 | 23.90 | 0.02 | 165.91 | 98.41 | 1.57 |
| 93.95 | 0.00 | 22.42 | 0.02 | 155.60 | 98.42 | 1.57 |
| 93.95 | 0.00 | 20.93 | 0.01 | 145.30 | 98.42 | 1.57 |
| 93.96 | 0.00 | 19.45 | 0.01 | 135.00 | 98.42 | 1.57 |
| 93.96 | 0.00 | 17.96 | 0.01 | 124.69 | 98.42 | 1.57 |
| 93.97 | 0.00 | 16.48 | 0.01 | 114.39 | 98.42 | 1.57 |
| 93.97 | 0.00 | 15.00 | 0.01 | 104.09 | 98.42 | 1.57 |
| 93.97 | 0.00 | 13.51 | 0.01 | 93.78 | 98.42 | 1.57 |
| 93.98 | 0.00 | 12.03 | 0.01 | 83.48 | 98.42 | 1.57 |
| 93.98 | 0.00 | 10.54 | 0.01 | 73.17 | 98.42 | 1.57 |
| 93.99 | 0.00 | 9.06 | 0.01 | 62.87 | 98.43 | 1.57 |
| 93.99 | 0.00 | 7.57 | 0.01 | 52.56 | 98.43 | 1.57 |
| 94.00 | 0.00 | 6.09 | 0.00 | 42.26 | 98.43 | 1.57 |
| 94.00 | 0.00 | 4.60 | 0.00 | 31.95 | 98.43 | 1.57 |
| 94.00 | 0.00 | 3.12 | 0.00 | 21.65 | 98.43 | 1.57 |
| 94.01 | 0.00 | 2.97 | 0.00 | 20.62 | 98.43 | 1.57 |
| 94.01 | 0.00 | 1.49 | 0.00 | 10.31 | 98.43 | 1.57 |

The invention claimed is:

1. A process for producing a $CON_x$-lean product gas from a $CO_x$-containing feed gas, said process comprising:

providing a sorption enhanced reactor containing a first bed, an intermediate bed downstream of the first bed and a second bed downstream of the intermediate bed, and wherein the first bed contains a first adsorbent, the second bed contains a mixture of a second adsorbent and a shift catalyst, and the intermediate bed contains the shift catalyst;

feeding the feed gas into the reactor at a feed gas pressure during a reaction step, wherein the feed gas comprises $H_2$, $H_2O$, CO and $CO_2$;

contacting the feed gas with the first adsorbent to adsorb an amount of $CO_2$ from the feed gas and to provide a $CO_2$ depleted feed gas;

contacting the $CO_2$ depleted feed gas with the shift catalyst to catalyze a shift reaction of CO and $H_2O$ to form a product mixture comprising $CO_2$ and $H_2$;

contacting the product mixture with the mixture of the second adsorbent and the shift catalyst to produce the product gas, wherein the product gas comprises at least 50 vol. % $H_2$ and less than 5 combined vol. % $CO_2$ and CO;

regenerating the first adsorbent and the second adsorbent;

repressurizing the reactor with a pressurization gas; and countercurrently purging the reactor at the feed gas pressure with a purge gas before regenerating the first adsorbent and the second adsorbent to yield an effluent stream containing unreacted CO and $H_2O$, and recycling the effluent stream to the feed gas.

2. The process of claim 1, wherein the first adsorbent and the second adsorbent are independently at least one member selected from the group consisting of: (a) $K_2$ $CO_3$ promoted hydrotalcites; (b) modified double layered hydroxides represented by Formula I:

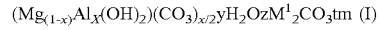

where $0.09 \leq x \leq 0.40$, $0 \leq y \leq 3.5$, $0 \leq z \leq 3.5$, and $M^1$ is Na or K; (c) spinels and modified spinels represented by Formula II:

$$Mg(A_{12})_{o4}yK_2CO_3 tm \quad (II)$$

where $0 \leq y \leq 3.5$; and (d) magnesium oxide-containing adsorbents represented by Formula III:

$$\{(M_2CO_3)_m(2MHCO_3)_{(1-m)}\}_n(MgCO_3)_p(MgO)_{(1-p)} xH_2O\ tm\ (III)$$

where M is an alkali metal, $0 \leq m \leq 1$, $0 \leq n \leq 1.3$, $0 \leq p < 1$, and x represents an extent of hydration of the adsorbent, with the proviso that when n equals 0 the MgO is made by dehydration and $CO_2$ removal of $\{MgCO_3\}_y$ $\{Mg(OH)_2\}_{(1-y)}xH_2$, O in which $0.1 \leq y \leq 0.9$, and x indicates an extent of hydration.

3. The process of claim 1, wherein the feed gas is a syngas effluent from a high temperature shift reactor, and a raw syngas to the high temperature shift reactor is obtained from a steam methane reformer, partial oxidation reactor, air-blown autothermal reformer or oxygen-blown autothermal reformer upstream of the reactor.

4. The process of claim 1, wherein the feed gas is fed into the reactor at a flow rate of 5-50 gmole/hr/cm² and a reactor temperature during the process is maintained between 175° C. and 550° C.

5. The process of claim 1, wherein the purge gas comprises at least one of steam and a steam/$H_2$ mixture.

6. The process of claim 1, wherein the process is conducted in a series of cycles in more than one said reactor, and a first reactor is being regenerated while a second reactor is being operated in parallel to produce the product gas.

7. A process for producing a $CO_x$-lean product gas from a $CO_x$-containing feed gas, said process comprising:
providing a sorption enhanced reactor containing a first bed, an intermediate bed downstream of the first bed and a second bed downstream of the intermediate bed, and wherein the first bed contains a first adsorbent, the second bed contains a mixture of a second adsorbent and a shift catalyst, and the intermediate bed contains the shift catalyst;
feeding the feed gas into the reactor at a feed gas pressure during a reaction step wherein the feed gas comprises $H_2$, $H_2O$, CO and $CO_2$;
contacting the feed gas with the first adsorbent to adsorb an amount of $CO_2$ from the feed gas and to provide a $CO_2$ depleted feed gas;
contacting the $CO_2$ depleted feed gas with the shift catalyst to catalyze a shift reaction of CO and $H_2$O to form a Product mixture comprising $CO_2$ and $H_2$:
contacting the Product mixture with the mixture of the second adsorbent and the shift catalyst to Produce the product gas, wherein the product gas comprises at least 50 vol. % $H_2$ and less than 5 combined vol. % $CO_2$ and CO;
regenerating the first adsorbent and the second adsorbent;
repressurizing the reactor with a pressurization gas; and
cocurrently rinsing the reactor at the feed gas pressure with a $CO_2$ product before regenerating the first adsorbent and the second adsorbent and recovering a $CO_2$-rich byproduct stream during the regenerating step.

8. The process of claim 7, wherein the first adsorbent and the second adsorbent are independently at least one member selected from the group consisting of: (a) $K_2CO_3$ promoted hydrotalcites; (b) modified double layered hydroxides represented by Formula I:

$$(Mg_{(1-x)}Al_x(OH)_2)(CO_3)_{x/2}yH_2OzM^1{}_2\ CO_3 tm\ (I)$$

where $0.09 \leq x \leq 0.40$, $0 \leq y \leq 3.5$, $0 \leq z \leq 3.5$, and $M^1$ is Na or K; (c) spinels and modified spinels represented by Formula II:

$$Mg(Al_2)O_4yK_2\ CO_3 tm\ (II)$$

where $0 \leq y \leq 3.5$; and (d) magnesium oxide-containing adsorbents represented by Formula III:

$$\{(M_2CO_3)_m(2MHCO_3)_{(1-m)}\}_n(MgCO_3)_p(MgO)_{(1-p)} xH_2O\ tm\ (III)$$

where M is an alkali metal, $0 \leq m \leq 1$, $0 \leq n \leq 1.3$, $0 \leq p < 1$, and x represents an extent of hydration of the adsorbent, with the proviso that when n equals 0 the MgO is made by dehydration and $CO_2$ removal of $\{MgCO_3\}_y$ $\{Mg(OH)_2\}_{(1-y)}xH_2$ O, in which $0.1 \leq y \leq 0.9$, and x indicates an extent of hydration.

9. The process of claim 7, wherein the feed gas is a syngas effluent from a high temperature shift reactor, and a raw syngas to the high temperature shift reactor is obtained from a steam methane reformer, partial oxidation reactor, air-blown autothermal reformer or oxygen-blown autothermal reformer upstream of the reactor.

10. The process of claim 7, wherein the feed gas is fed into the reactor at a flow rate of 5-50 gmole/hr/cm² and a reactor temperature during the process is maintained between 1750° C. and 550° C.

11. The process of claim 7, wherein the process is conducted in a series of cycles in more than one said reactor, and a first reactor is being regenerated while a second reactor is being operated in parallel to produce the product gas.

* * * * *

UNITED STATES PATENT AND TRADEMARK OFFICE
CERTIFICATE OF CORRECTION

PATENT NO.       : 7,354,562 B2
APPLICATION NO.  : 10/280843
DATED            : April 8, 2008
INVENTOR(S)      : David Hon Sing Ying et al.

It is certified that error appears in the above-identified patent and that said Letters Patent is hereby corrected as shown below:

Column 14, Line 30
In claim 1 delete the word "$CON_x$-lean" and insert the word -- $CO_x$-lean --

Column 14, Line 67
In claim 2 delete the word "$(Mg_{(1-x)}Al_x(OH)_2)(CO_3)_{x/2}yH_2OzM^1{}_2CO_3tm$ (I)" and insert the words -- $(Mg_{(1-x)}Al_x(OH)_2)(CO_3)_{x/2}yH_2OzM^1{}_2CO_3$     (I) --

Column 15, Line 1
In claim 2 delete the words "$0.09 \leqq x \leqq 0.40, 0 \leqq y \leqq 3.5, 0 \leqq z \leqq 3.5$" and insert
-- $0.09 \leq x \leq 0.40, 0 \leq y \leq 3.5, 0 \leq z \leq 3.5$ --

Column 15, Line 5
In claim 2 delete the word "$Mg(A_{12})_{o4}yK_2CO_3tm$ (II)" and insert
-- $Mg(Al_2)O_4yK_2CO_3$     (II) --

Column 15, Line 6
In claim 2 delete the words "$0 \leqq y \leqq 3.5;$" and insert the words -- $0 \leq y \leq 3.5;$ --

Column 15, Line 7
In claim 2 delete the word "Ill" and insert the word -- III --

Column 15, Line 8/9
In claim 2 delete the words "$\{(M_2CO_3)_m(2MHCO_3)_{(1-im)}\}_n(MgCO_3)_p(MgO)_{(1-p)}xH_2Otm$ (III)" and insert the words
-- $\{(M_2CO_3)_m(2MHCO_3)_{(1-m)}\}_n(MgCO_3)_p(MgO)_{(1-p)}xH_2O$     (III) --

Column 15, Line 10
In claim 2 delete the words "$0 \leqq m \leqq 1, 0 \leqq n \leqq 1.3, 0 \leqq p < 1$" and insert the words
-- $0 \leq m \leq 1, 0 \leq n \leq 1.3, 0 \leq p < 1$ --

Column 15, Line 14
In claim 2 delete the words "$\{MgCO_3\}_y\{Mg(OH)_2\}_{(1-y)}xH_2, O$" and insert the words
-- $\{MgCO_3\}_y\{Mg(OH)_2\}_{(1-y)}xH_2O,$ --

Column 15, Line 14
In claim 2 delete the words "$\leqq y \leqq 0.9,$" and insert the words -- $\leq y \leq 0.9,$ --

UNITED STATES PATENT AND TRADEMARK OFFICE
CERTIFICATE OF CORRECTION

PATENT NO. : 7,354,562 B2
APPLICATION NO. : 10/280843
DATED : April 8, 2008
INVENTOR(S) : David Hon Sing Ying et al.

It is certified that error appears in the above-identified patent and that said Letters Patent is hereby corrected as shown below:

Column 15, Line 49
In claim 7 delete the words "H$_2$ O" and insert the words -- H$_2$O --

Column 15, Line 49
In claim 7 delete the word "Product" and insert the word -- product --

Column 16, Line 1
In claim 7 delete the word "Product" and insert the word -- product --

Column 16, Line 2
In claim 7 delete the word "Produce" and insert the word -- produce --

Column 16, Lines 4-8
In claim 7 rewrite as follows:
-- 50 vol. % H$_2$ and less than 5 combined vol. % CO$_2$ and CO;
regenerating the first adsorbent and the second adsorbent;
repressurizing the reactor with a pressurization gas; and
cocurrently rinsing the reactor at the feed gas pressure --

Column 16, Line 18
In claim 8 delete the word "Mg$_{(1-x)}$Al$_x$(OH)$_2$)(CO$_3$)$_{x/2}$yH$_2$Ozm$^1_2$CO$_3$tm (I)" and insert the word -- Mg$_{(1-x)}$Al$_x$(OH)$_2$)(CO$_3$)$_{x/2}$yH$_2$Ozm$^1_2$CO$_3$    (I) --

Column 16, Line 19
In claim 8 delete the words "0.09 $\leq$ x $\leq$ 0.40, 0 $\leq$ y $\leq$ 3.5, 0 $\leq$ z $\leq$ 3.5, and M$^{l}$" and insert -- 0.09 $\leq$ x $\leq$ 0.40, 0 $\leq$ y $\leq$ 3.5, 0 $\leq$ z $\leq$ 3.5, and M$^1$ --

Column 16, Line 23
In claim 8 delete the word "Mg(Al$_2$)O$_4$yK$_2$ CO3tm (II)" and insert the word
-- Mg(Al$_2$)O$_4$yK$_2$CO$_3$    (II) --

Column 16, Line 24
In claim 8 delete the words "0 $\leq$ y $\leq$ 3.5;" and insert the words -- 0 $\leq$ y $\leq$ 3.5; --

Column 16, Line 25
In claim 8 delete the word "Ill:" and insert the word -- III: --

UNITED STATES PATENT AND TRADEMARK OFFICE
CERTIFICATE OF CORRECTION

PATENT NO. : 7,354,562 B2
APPLICATION NO. : 10/280843
DATED : April 8, 2008
INVENTOR(S) : David Hon Sing Ying et al.

It is certified that error appears in the above-identified patent and that said Letters Patent is hereby corrected as shown below:

Column 16, Line 28
In claim 8 delete the words "$xH_2O$ tm (Ill)" and insert the words
-- $xH_2O$ (III) --

Column 16, Line 29
In claim 8 delete the words "$0 \leqq m \leqq 1, 0 \leqq n \leqq 1.3, 0 \leqq p < 1$" and insert the words
-- $0 \leq m \leq 1, 0 \leq n \leq 1.3, 0 \leq p < 1$ --

Column 16, Line 33
In claim 8 delete the words "$0.1 \leqq y \leqq 0.9$" and insert the words -- $0.1 \leq y \leq 0.9$ --

Column 16, Line 43
In claim 10 delete the words "1750°" and insert the word -- 175° --

Signed and Sealed this

Twenty-fourth Day of June, 2008

JON W. DUDAS
*Director of the United States Patent and Trademark Office*